US008256639B1

(12) United States Patent
Samuelson et al.

(10) Patent No.: US 8,256,639 B1
(45) Date of Patent: Sep. 4, 2012

(54) TRAVEL BOWL ASSEMBLY FOR PEOPLE

(75) Inventors: Loren J. Samuelson, Brighton, CO (US); Nancy J. Cribb, Delray Beach, FL (US)

(73) Assignee: L J S Sales, LLC, Brighton, CO (US)

(*) Notice: Subject to any disclaimer, the term of this patent is extended or adjusted under 35 U.S.C. 154(b) by 522 days.

(21) Appl. No.: 12/477,060

(22) Filed: Jun. 2, 2009

Related U.S. Application Data

(63) Continuation-in-part of application No. 12/263,549, filed on Nov. 3, 2008, now Pat. No. 8,015,943, which is a continuation-in-part of application No. 12/201,207, filed on Aug. 29, 2008, now Pat. No. 7,634,973.

(51) Int. Cl.
*A47G 19/02* (2006.01)
*B65D 21/02* (2006.01)
*B65D 55/16* (2006.01)

(52) U.S. Cl. .................... 220/575; 220/23.4; 220/23.86; 220/379; 220/574

(58) Field of Classification Search .................. 220/575, 220/574, 23.86, 23.83, 23.4, 23.6
See application file for complete search history.

(56) References Cited

U.S. PATENT DOCUMENTS 3,205,861 A 9/1965 Moore
3,749,063 A 7/1973 Buffum
4,192,256 A 3/1980 Clugston
4,436,056 A 3/1984 MacLeod
4,938,373 A * 7/1990 McKee ...................... 220/23.86
5,058,737 A * 10/1991 Patterson et al. ............. 206/217
5,105,769 A 4/1992 Smith et al.
5,180,079 A * 1/1993 Jeng ............................. 220/705
5,209,184 A 5/1993 Sharkan et al.
5,488,927 A 2/1996 Lorenzana et al.
5,752,464 A 5/1998 King et al.
5,809,935 A 9/1998 Kolterman et al.
5,881,670 A 3/1999 Pelsor
5,954,195 A 9/1999 Krueger et al.
5,960,741 A 10/1999 Ballen et al.
6,082,301 A 7/2000 Kramer
6,101,974 A 8/2000 Frohlich
6,109,580 A 8/2000 Stern et al.
6,113,049 A 9/2000 Miljanich
6,138,860 A * 10/2000 Comeaux ...................... 220/574
D456,761 S 5/2002 Hoy
6,425,480 B1 * 7/2002 Krueger et al. ............... 206/217
6,474,494 B1 * 11/2002 Miller ........................... 220/379
6,533,233 B2 3/2003 Thomas
(Continued)

*Primary Examiner* — Mickey Yu
*Assistant Examiner* — Niki Eloshway
(74) *Attorney, Agent, or Firm* — A Law Firm, PC; Aileen Law

(57) ABSTRACT

A travel bowl assembly for traveling in a vehicle including a bowl divided into a snack section and a cup holder section. A container extends downward from a bottom of the bowl member, secondarily used as a cup holder insert and assembly support. The cup holder insert can be integrated or removably attached to the bowl. A pliant adapter can be integrated or removably attached to the cup holder insert. The pliant adapter utilizes flexible winglets for compensating between dimensional differences between the cup holder insert and a receiving cup holder. The pliant adapter is formed having a tapered sleeve for sliding the adapter onto a tapered sidewall of the cup holder insert. A cover can be provided, sealing the snack section of the bowl. A lid can be provided, sealing the container. The lid can be fastened to a storage interface disposed on the lower surface of the bowl.

20 Claims, 17 Drawing Sheets

100 120 124 120 124 112 104 114 116 136 106 102 110 134 144 142 140 130 119

200 220 204 202 206 132 232 230 144 140 142 130

U.S. PATENT DOCUMENTS

| | | | | |
|---|---|---|---|---|
| 6,644,241 | B2 | 11/2003 | Brown | |
| 6,732,990 | B2 | 5/2004 | Hudson | |
| 6,971,331 | B1 | 12/2005 | Rohrer | |
| 7,387,082 | B1 | 6/2008 | Fried | |
| 7,422,184 | B2 | 9/2008 | Carnevali | |
| 7,611,114 | B1 | 11/2009 | Griffin | |
| 2001/0032791 | A1 | 10/2001 | Hudson | |
| 2002/0185578 | A1 | 12/2002 | Hudson | |
| 2003/0052018 | A1* | 3/2003 | Wilson | 206/217 |
| 2003/0116094 | A1 | 6/2003 | Dlin | |
| 2003/0141424 | A1 | 7/2003 | Thomas | |
| 2003/0146223 | A1* | 8/2003 | Loh | 220/575 |
| 2004/0084458 | A1* | 5/2004 | Krueger et al. | 220/574 |
| 2004/0086112 | A1 | 5/2004 | Hilger et al. | |
| 2004/0144904 | A1* | 7/2004 | Carnevali | 248/278.1 |
| 2004/0213405 | A1 | 10/2004 | Wilcox | |
| 2006/0214075 | A1 | 9/2006 | Cassettari et al. | |
| 2008/0078773 | A1 | 4/2008 | Cassese et al. | |
| 2008/0121550 | A1* | 5/2008 | Anderson et al. | 206/562 |
| 2008/0142528 | A1* | 6/2008 | Lim | 220/575 |
| 2008/0257895 | A1* | 10/2008 | Broselow | 220/574 |

* cited by examiner

TRAVEL BOWL ASSEMBLY FOR PEOPLE

CROSS-REFERENCE TO RELATED APPLICATION

This Non-Provisional Utility application is a Continuation-In-Part of, and claims benefit of, co-pending U.S. Non-Provisional patent application Ser. No. 12/263,549, filed on Nov. 3, 2008, which claims benefit of co-pending U.S. Non-Provisional patent application Ser. No. 12/201,207, filed on Aug. 29, 2008, which claims benefit of U.S. Non-Provisional patent application Ser. No. 11/588,541, filed on Oct. 27, 2006, and now issued as U.S. Pat. No. 7,527,017, issued on May 5, 2009, all of which are incorporated herein in its entirety.

FIELD OF THE INVENTION

The present invention relates to travel accessories, and more particularly, to a travel bowl, including a food container and drink holder carried by a removable cup holder insert, for adaptation to a vehicle.

BACKGROUND OF THE INVENTION

Many people have a desire to eat snacks and drink while traveling in a vehicle. It is considered difficult and distracting to snack and drink while driving. Passengers prefer to have a location to hold their snacks and drinks while traveling to avoid leaving crumbs and other undesirable residue in the vehicle. Drink holders are considered a standard feature in modern vehicles, while food storage compartments are lacking.

Snacks are normally stored in the original packaging and positioned in non-optimal places, such as against the seat door pockets, between the seat and the center console, and the like, in order to avoid being spilled. Further, snacks such as fast foods (hamburgers, French fries, and the like) are typically not conducive to the same type of storage or packaging as general consumer grocery products.

Accordingly, there remains in the art a need for a travel bowl for holding and storing snacks and drinks in a vehicle where the holder is inexpensive, lightweight, and optionally includes a seal-able cover for preventing snacks from becoming stale. It is desirable for the travel bowl to be securely stabilized within a vehicle when the vehicle is in motion.

SUMMARY OF THE INVENTION

The present invention overcomes the deficiencies of the known art and the problems that remain unsolved by providing a travel bowl assembly for use in a vehicle where the travel bowl assembly is portable, gives rise to manufacturing economy, and is easy to maintain and use. Moreover, the overall construction of the travel bowl assembly provides a removable cover for sealing a snack portion of the bowl while allowing the user to simultaneously secure a drink within the apparatus.

In accordance with one embodiment of the present invention, there is provided a travel bowl assembly comprising a container comprising a base and sidewall defining a container receptacle for holding food and/or fluids, the receptacle having an oval shaped bowl including a vertical wall and an oval shaped base wall. The travel bowl assembly further includes a lid that is removably attached to a portion of the oval shaped bowl providing a seal for maintaining food within the bowl receptacle.

Advantageously, the travel bowl includes a cup holder insert in a shape and size that dimensionally corresponds to a shape and size of a recess of a cup holder in a console of a vehicle such that the cup holder insert is securely retained within the recess of the vehicle's cup holder. The cup holder insert, and oval shaped bowl are dimensionally configured to provide a selected storage capacity, and can be integrally molded as one piece or a plurality of interconnecting components. Alternatively, the bowl can be provided in any reasonable shape conducive to the application of the present invention.

In one aspect, the travel bowl member includes a dividing wall disposed within the oval shaped bowl forming a food storage compartment and a drink holder portion.

A bowl lid is provided having a peripheral shape conforming to the food compartment portion of the travel bowl, the lid being removably attached to the shaped bowl by any one of a snap-on feature, a living hinge, a magnet, a clip, a rotating post, a hook and loop, sliding rails, threads, or pressure detents.

In accordance with an alternative embodiment of the present invention, there is provided a travel bowl assembly comprising a cup holder insert including a container receptacle for holding snacks, with an upper portion having threads. The travel bowl assembly further includes a threaded recess (a coupling interface) formed within the base of the bowl for detachably receiving the upper portion of the cup holder insert; thereby sealing snacks within a receptacle formed within the cup holder insert. The coupling interface can be provided within the base of the bowl or extending there from. A leveling feature can be provided extending from the base of the bowl, such that the leveling feature compensates for the extending coupling interface thus supporting the bowl ensuring it remains level.

Preferably, the cup holder insert includes a shape and size that dimensionally corresponds to a shape and size of a recess of a cup holder that is included in any one of a console of a vehicle including a boat, truck, van, transport, airplane, camper, RV, bus, train, ATV, or table, chair, or any other mode or device that includes a cup holder for securely holding a cup therein. The cup holder insert can include a plaint member for adapting the shape and size of the cup holder insert to the shape and size of a vehicle cup holder. The pliant member can be assembled to or removably attached to the cup holder insert. The pliant member can consist of a series of winglets projecting radially from the exterior wall of the pliant member.

In yet another aspect, the cup holder insert and the bowl are either integrally molded as one piece providing the cup holder insert receptacle to be in fluid communication with the bowl receptacle, or the cup holder insert is separately attached to the bowl having a means for detachably receiving formed therein for releasably attaching the cup holder insert to the bowl. The means for detachably engaging may include any one of threads, a bayonet connection, a snap-on feature, a slide means, magnets, pressure detents and the like.

Another aspect of the present invention provides an adapting sleeve, which compensates for a variety of cup holder designs and dimensions, via a plurality of flexible adapter winglets. The winglets can extend from a tubular sleeve having the dimensions consistent with the mating dimensions of the cup holder insert. The cup holder insert can be tapered (or funnel shaped) providing assistance in mating the tubular sleeve to the cup holder insert.

Regarding the embodiments described herein, as well as those covered by the claims, the travel bowl assembly is loaded with food and/or fluid and a lid is removably attached to the travel bowl. The travel bowl assembly is securely inserted within the recess of the cup holder of a vehicle console allowing the oval shaped bowl to extend partially between two front seats of a vehicle. The lid may be opaque or transparent for allowing a user to view the contents stored within the travel bowl. Further, the lid may include an extending grasp for assisting a user in removing the lid from the travel bowl. The cup holder insert, travel bowl and lid may having components fabricated utilizing glass, ceramic, metal, tin, a rigid or resilient material, a light-weight synthetic material or a polymeric material including plastic, rubber, urethane or neoprene material, or any combination thereof.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention.

Figure 1:
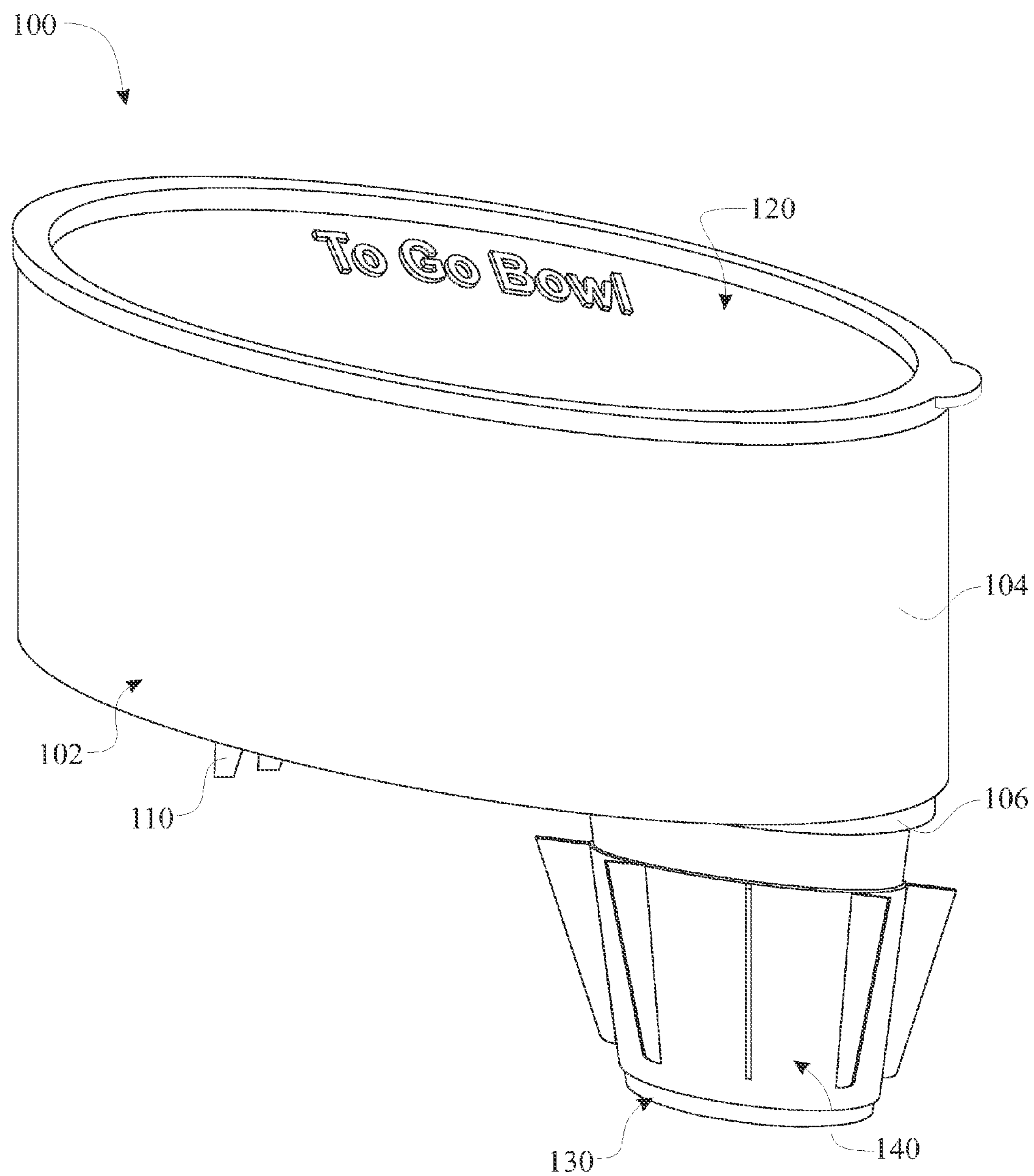
FIG. 1 is a perspective view of an exemplary embodiment of a travel bowl assembly, according to the present invention.
Figure 2:
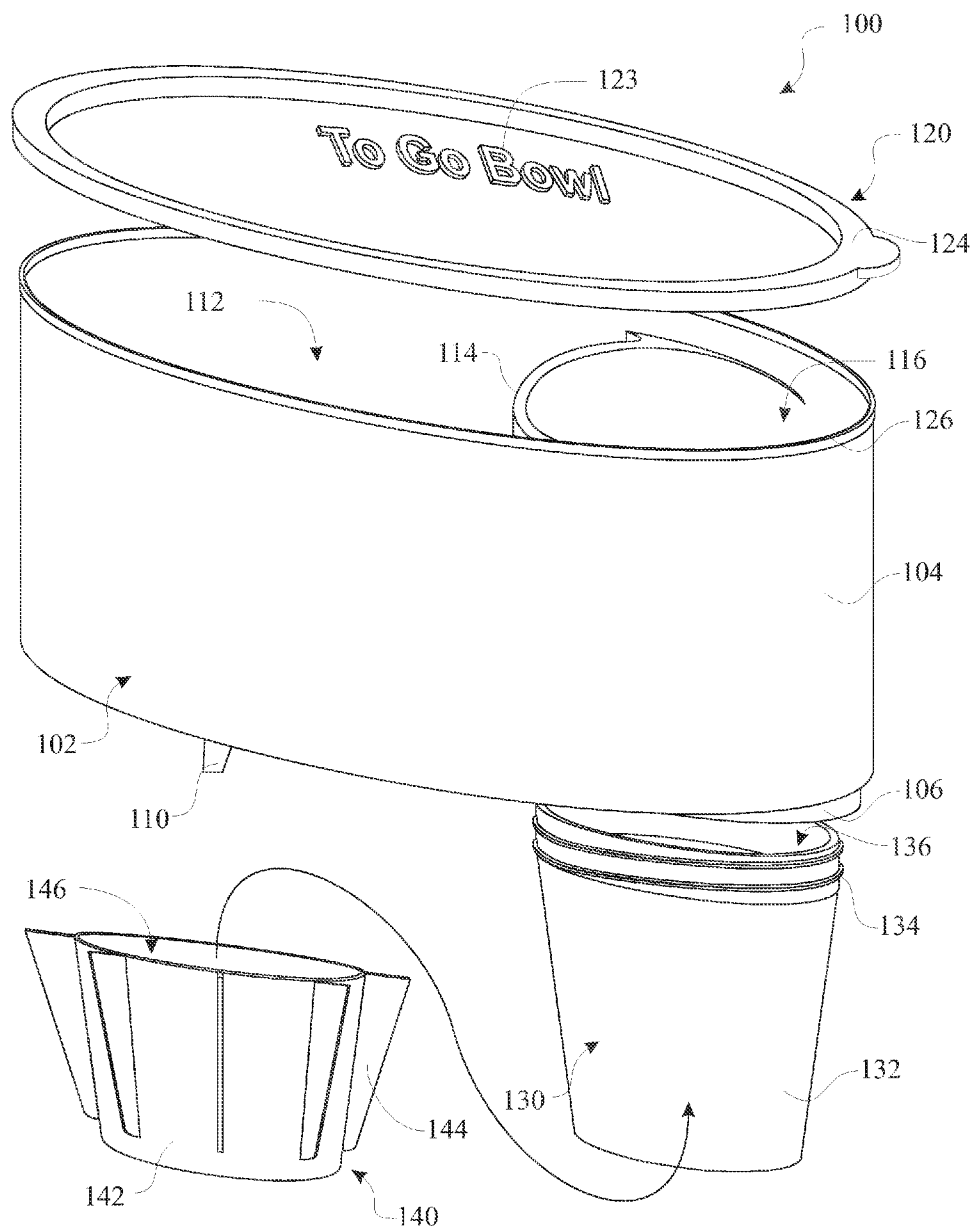
FIG. 2 is an exploded assembly view of the exemplary travel bowl assembly originally introduced in FIG. 1.
Figure 3:
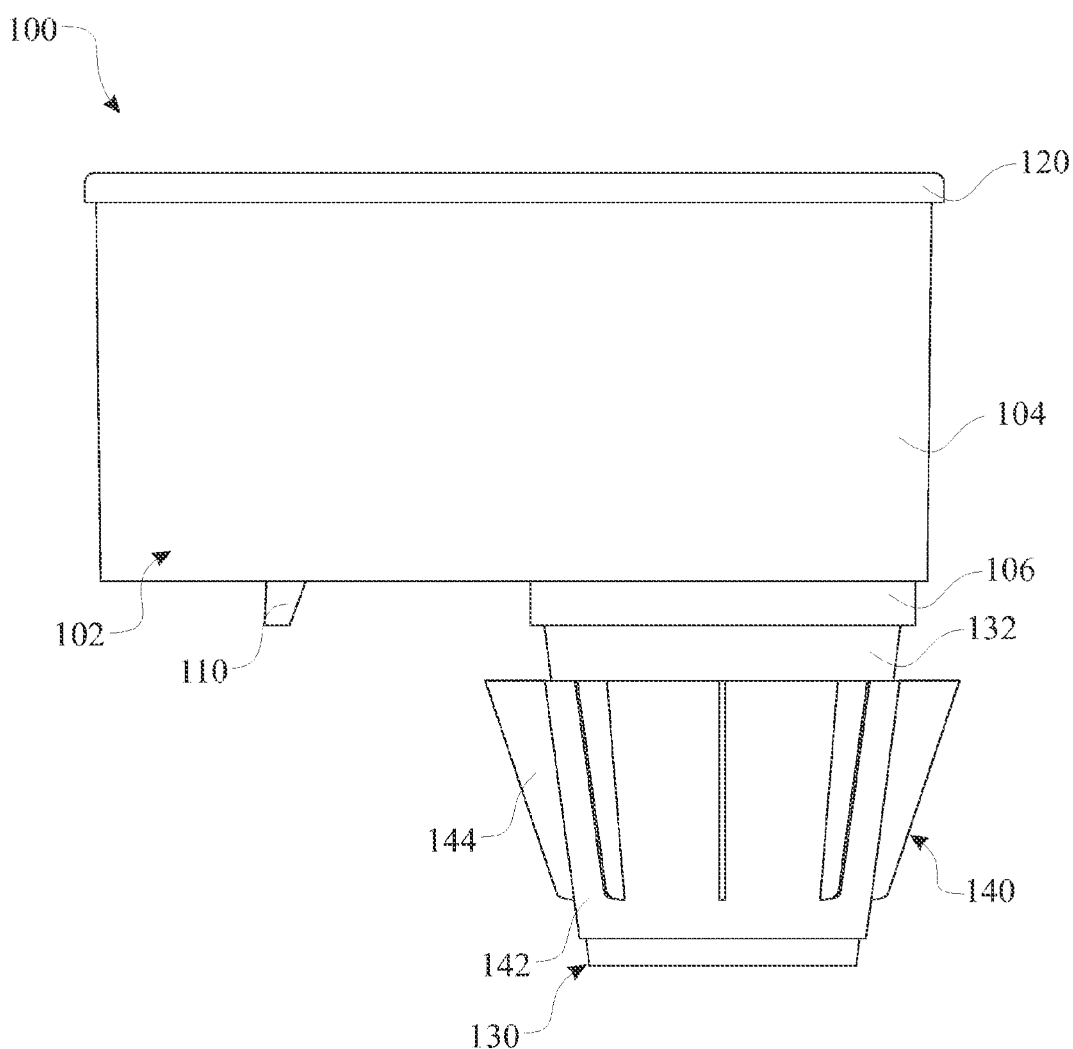
FIG. 3 is a side elevation view of the exemplary travel bowl assembly originally introduced in FIG. 1.
Figure 4:
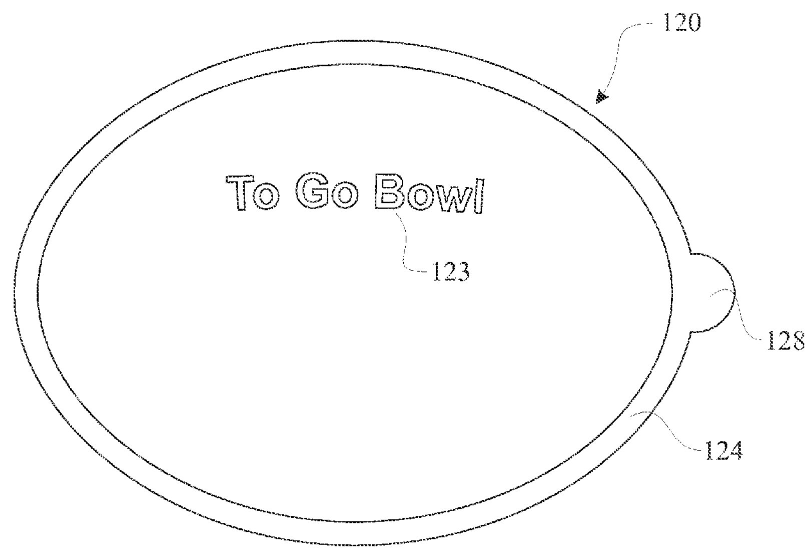
FIG. 4 is a top planar view of the exemplary travel bowl assembly originally introduced in FIG. 1.

Referring now to the drawings wherein like elements are represented by like numerals throughout, there is shown in FIG. 1 a perspective view of a travel bowl assembly 100, according to one embodiment of the present invention. Additional details of the travel bowl assembly 100 and the individual components are provided in FIGS. 2 through 14 presented herein. The travel bowl assembly 100 includes a bowl 102, a cover 120, and a cup holder insert 130. The bowl 102 is defined having a bowl body 104 comprising a snack containing section 112 and a drink holder section 116 separated via a bowl sectioning wall 114. A mount receptacle 106 is provided on a lower face of a base portion of the bowl body 104 and can extend from the bottom (as shown) or project upwards into the snack containing section 112 or drink holder section 116 regions. A leveling feature 110 can be included providing a planar supporting surface should the design of the mount receptacle 106 extend downward from the base of the bowl body 104. The leveling feature 110 can be of any reasonable form factor, such as two projecting legs as illustrated, a projecting ridge or wall, and the like, working in conjunction with the mount receptacle 106 for supporting the bowl 102 when placed upon a resting surface 150. The cover 120 provides a seal to retain freshness of snacks disposed within the snack containing section 112 of the bowl 102. A snap latch ring 126 can be formed about an upper edge of the bowl body 104 providing a means for sealing a cover securing interface 124 of the cover 120 to the bowl body 104.

The travel bowl assembly 100 is secured in the vehicle via the cup holder insert 130. The cup holder insert 130 is formed having a shape and size substantially similar to a shape and size of a common vehicle cup holder. The cup holder insert 130 is provided, preferably being removably attached to the bowl body 104 via a connection interface disposed between an upper edge of the cup holder insert 130 and the mount receptacle 106. The cup holder insert 130 is defined via a mount container body 132 having a horizontal base and a sidewall extending upwards from the edge of the horizontal base, forming an object storage receptacle 136. The object storage receptacle 136 provides a means for storing snacks 119 (FIG. 16) or other small items. Mount securing threads 134 are provided along the upper edge of the cup holder insert

130, wherein the mount securing threads 134 provide a mating connection interface for removably attaching the cup holder insert 130 to the mount receptacle 106. Alternately, the mount securing threads 134 can be of any known detachably engaging form factor including any one of threads (as shown), a bayonet connection, a snap-on feature, a slide means, magnets, pressure detents, and the like.

A cup holder adapter sleeve 140 can be provided to aid in conforming and securing the cup holder insert 130 to the vehicle cup holder. The cup holder adapter sleeve 140 includes a adapter body 142 having a shape and size similar to the exterior of the mount container body 132 and a plurality of adapter winglet panels 144 extending there from. The adapter winglet panels 144 are preferably thin, pliant ribs extending radially from the exterior surface of the adapter body 142, providing an adaptive means for ensuring a reliable holding interface between the cup holder insert 130 and the respective cup holder. The preferred shape of the adapter sleeve opening 146 of the adapter body 142 is tubular and tapering having a larger upper opening diameter with a smaller lower opening diameter, ensuring a reliable and repeatable mating between the mount container body 132 and the adapter body 142. The adapter winglet panels 144 are provided having a thin wall projecting radially from the adapter body 142 with a tapered distal edge. The adapter winglet panels 144 have an initial width at the lower edge, with a span from the central interface edge increasing in the radial direction as the adapter winglet panels 144 as the distal edge progresses towards the upper edge. The cup holder adapter sleeve 140 is fabricated of a pliant material such as nylon.

Figure 5:
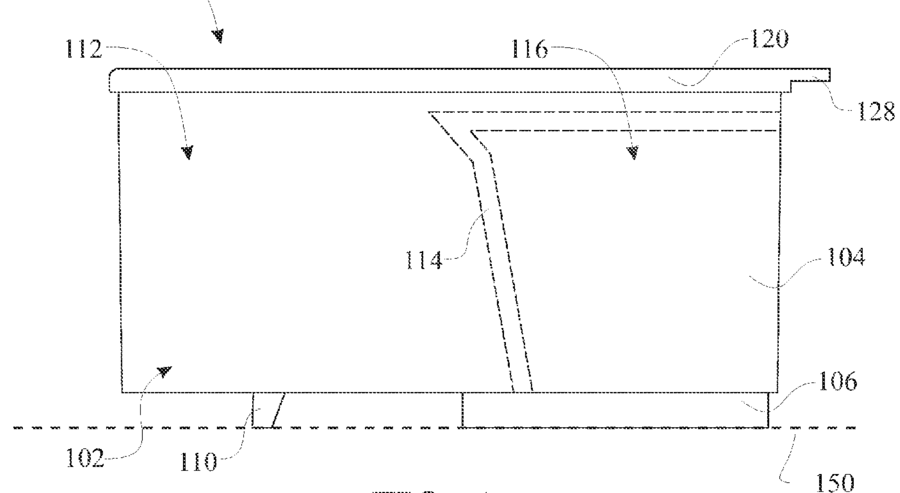
FIG. 5 is a side elevation view of the travel bowl assembly introducing a bowl interior compartment sectioning structure.
Figure 6:
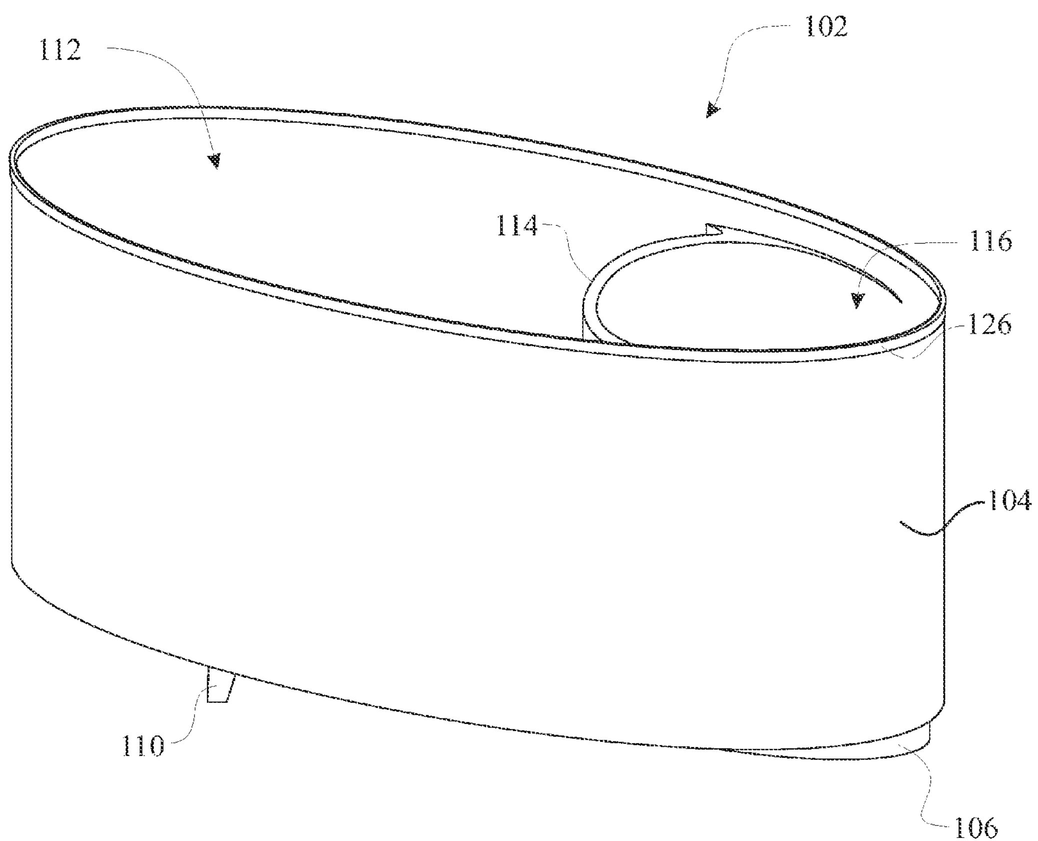
FIG. 6 is an isometric view of a bowl member of the travel bowl assembly.
Figure 7:
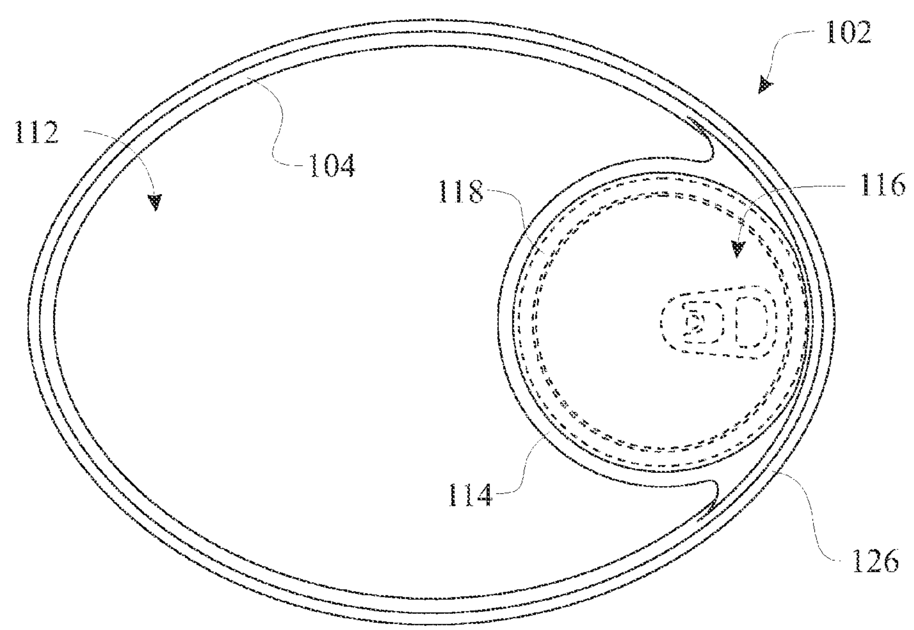
FIG. 7 is a top view of the bowl member of the travel bowl assembly.
Figure 8:
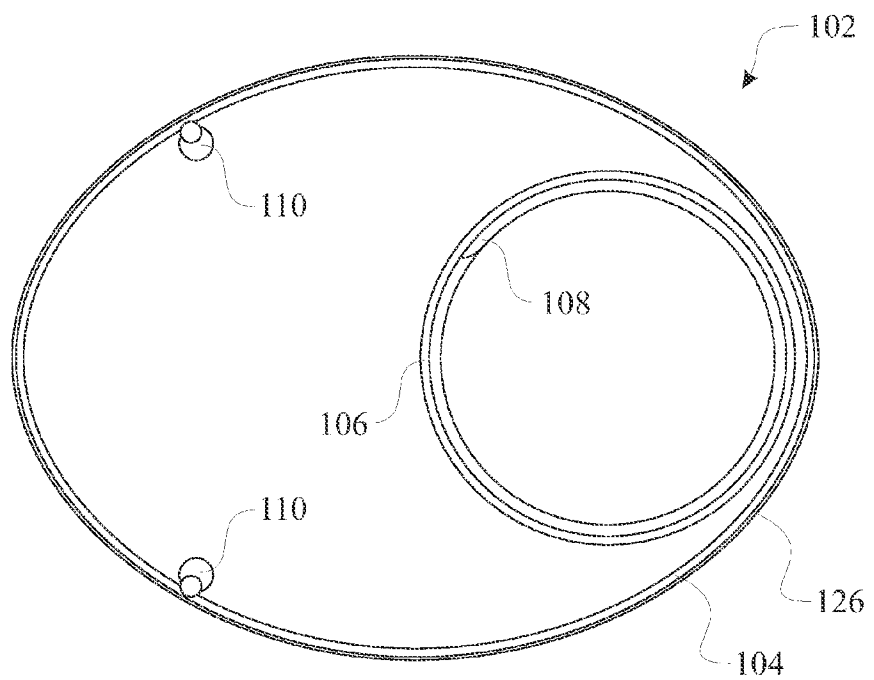
FIG. 8 is a bottom view of the bowl member of the travel bowl assembly.

The bowl 102 is presented in FIGS. 6 through 8. The bowl 102 is defined having a bowl body 104, divided into a snack containing section 112 and a drink holder section 116 via the incorporation of a bowl sectioning wall 114 as illustrated in FIGS. 5 through 7. The bowl sectioning wall 114 extends upwards from the base of the bowl body 104, formed in an arc spanning between two sections of the bowl's vertical wall. The bowl sectioning wall 114 divides the interior of the bowl 102 into two sections: the snack containing section 112 and the drink holder section 116. The bowl sectioning wall 114 is formed having a size and shape commonly utilized for a cup holder for containing items such as a drink 118. The exemplary embodiment presents a mount receptacle 106, having a mount receptacle coupling threads 108, disposed on a bottom surface of the bowl body 104. A pair of leveling features 110 projects from the bottom of the bowl body 104, projecting the same distance as the mount receptacle 106, thus providing a stable support of the travel bowl assembly 100 when the cup holder insert 130 is removed and the travel bowl assembly 100 is placed on a planar surface.

Figure 9:
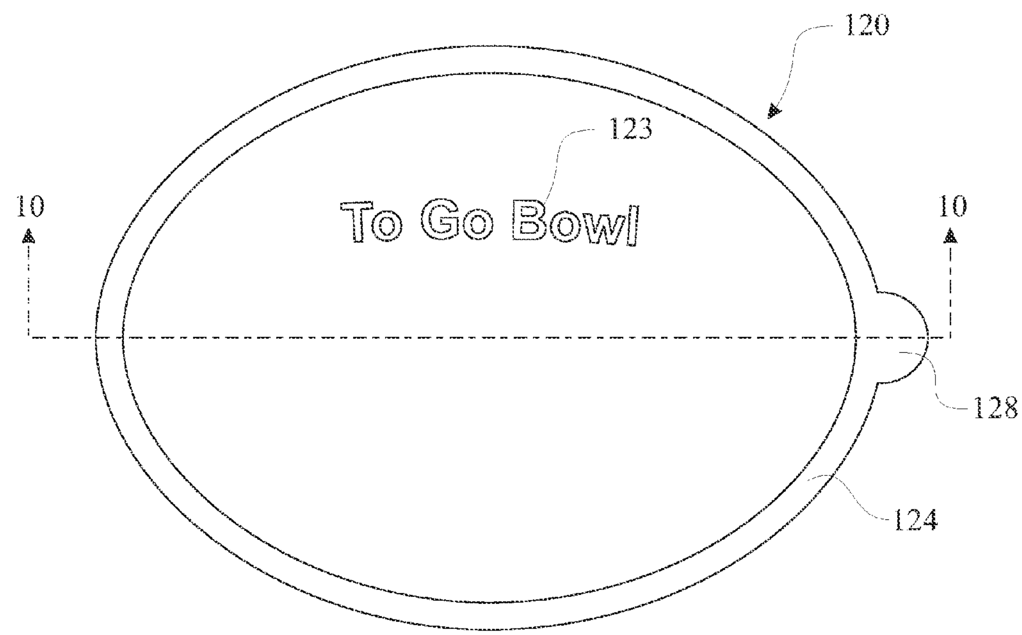
FIG. 9 is a top view of a first exemplary lid member of the travel bowl assembly.
Figure 10:
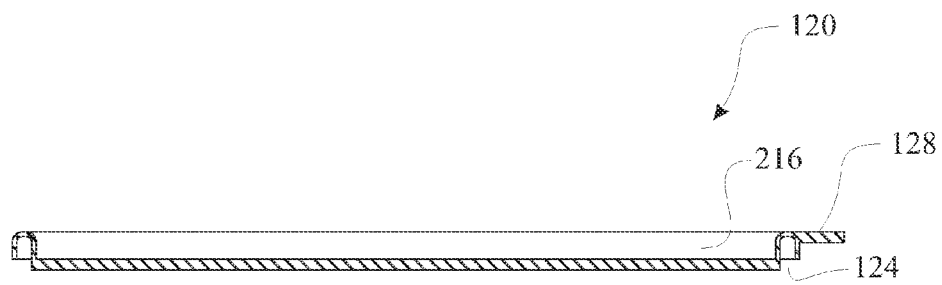
FIG. 10 is a side sectional view of the first exemplary lid member of the travel bowl assembly, the section taken along section 10-10 of FIG. 9.

The cover 120 can be provided in a variety of form factors with one exemplary embodiment being presented in FIGS. 9 and 10. The cover 120 includes features such as a cover securing interface 124 for removably securing the cover 120 to a snap latch ring 126 of the bowl 102 and a extending grasp 128 for assisting the user in removing the cover 120 from the bowl 102. An optional identification 123 can be disposed upon the lid surface. A first form factor presented seals the entire periphery of the entire upper edge of the bowl 102. Other geometries will be presented later herein.

Figure 11:
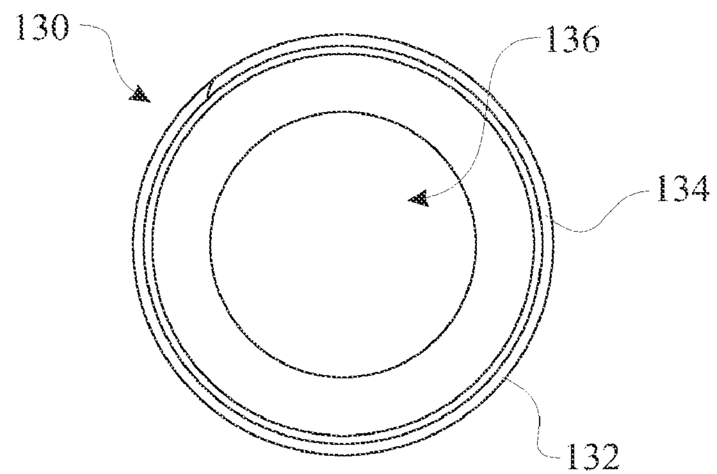
FIG. 11 is a top planar view of a cup holder insert member of the travel bowl assembly.
Figure 12:
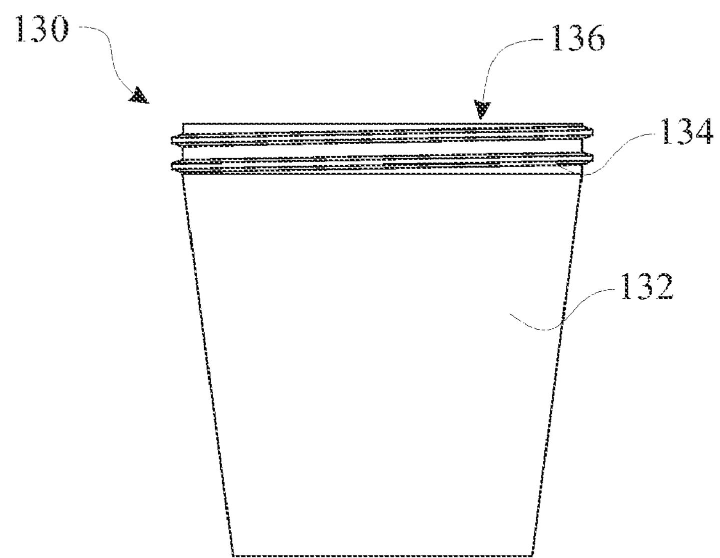
FIG. 12 is a side elevation view of the cup holder insert member of the travel bowl assembly.
Figure 13:
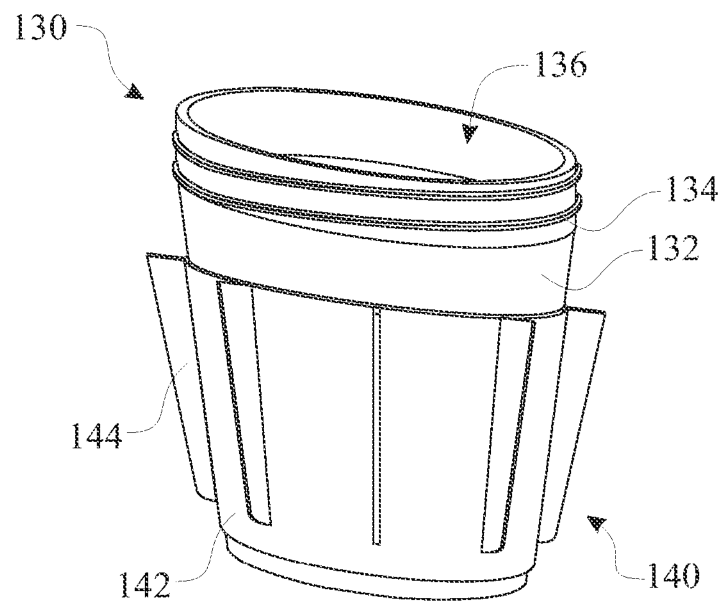
FIG. 13 is an isometric view of a pliant cup holder adapting member as assembled to the cup holder insert member of the travel bowl assembly.
Figure 14:
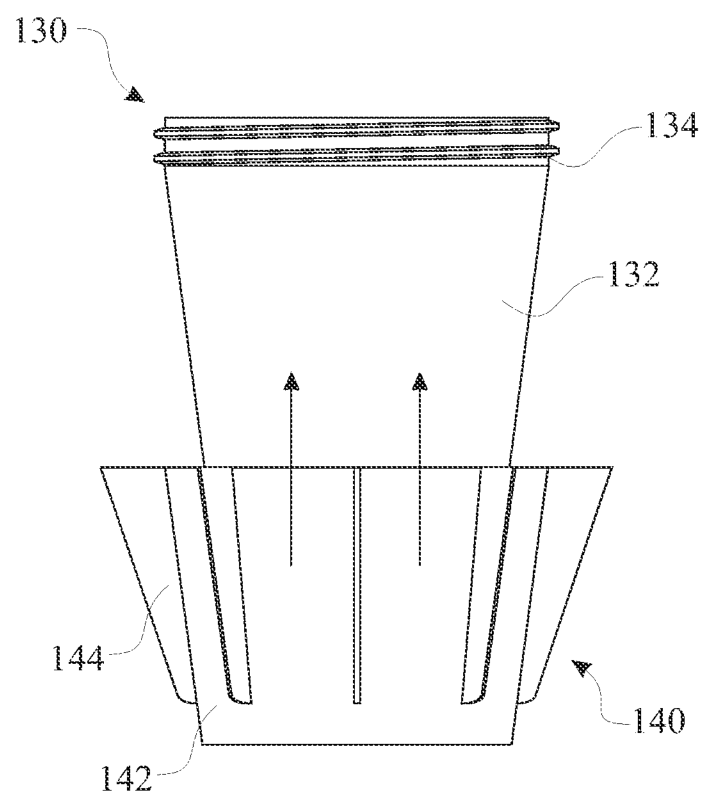
FIG. 14 is an elevation view of the pliant cup holder adapting member shown being assembled to the cup holder insert member of the travel bowl assembly.

The cup holder insert 130 is detailed in FIGS. 11 and 12, with the cup holder adapter sleeve 140 being assembled in FIGS. 13 and 14. The cup holder insert 130 is formed having a mount container body 132 extending from a peripheral edge of a bottom forming an object storage receptacle 136. A mount securing threads 134 is formed along the upper edge of the mount container body 132. Although the mount securing threads 134 is noted as having threads, it is recognized that other releasably attaching interfaces can be utilized for releasably coupling the cup holder insert 130 to the bowl 102. It is preferred that the mount container body 132 is tapered, having a smaller diameter along the lower portion of the cup holder insert 130. The diameter of the mount container body 132 would be compatible with generic cup holders. A cup holder adapter sleeve 140 can be included, being slideably assembled to the cup holder insert 130. The cup holder adapter sleeve 140 includes a plurality of adapter winglet panels 144 projecting radially from an adapter body 142. The adapter body 142 is shaped to slideably assemble to the cup holder insert 130, preferably utilizing a tapered shape to help ensure a reliable interface. The cup holder adapter sleeve 140 would be fabricated of a nylon or nylon-like material.

Figure 15:
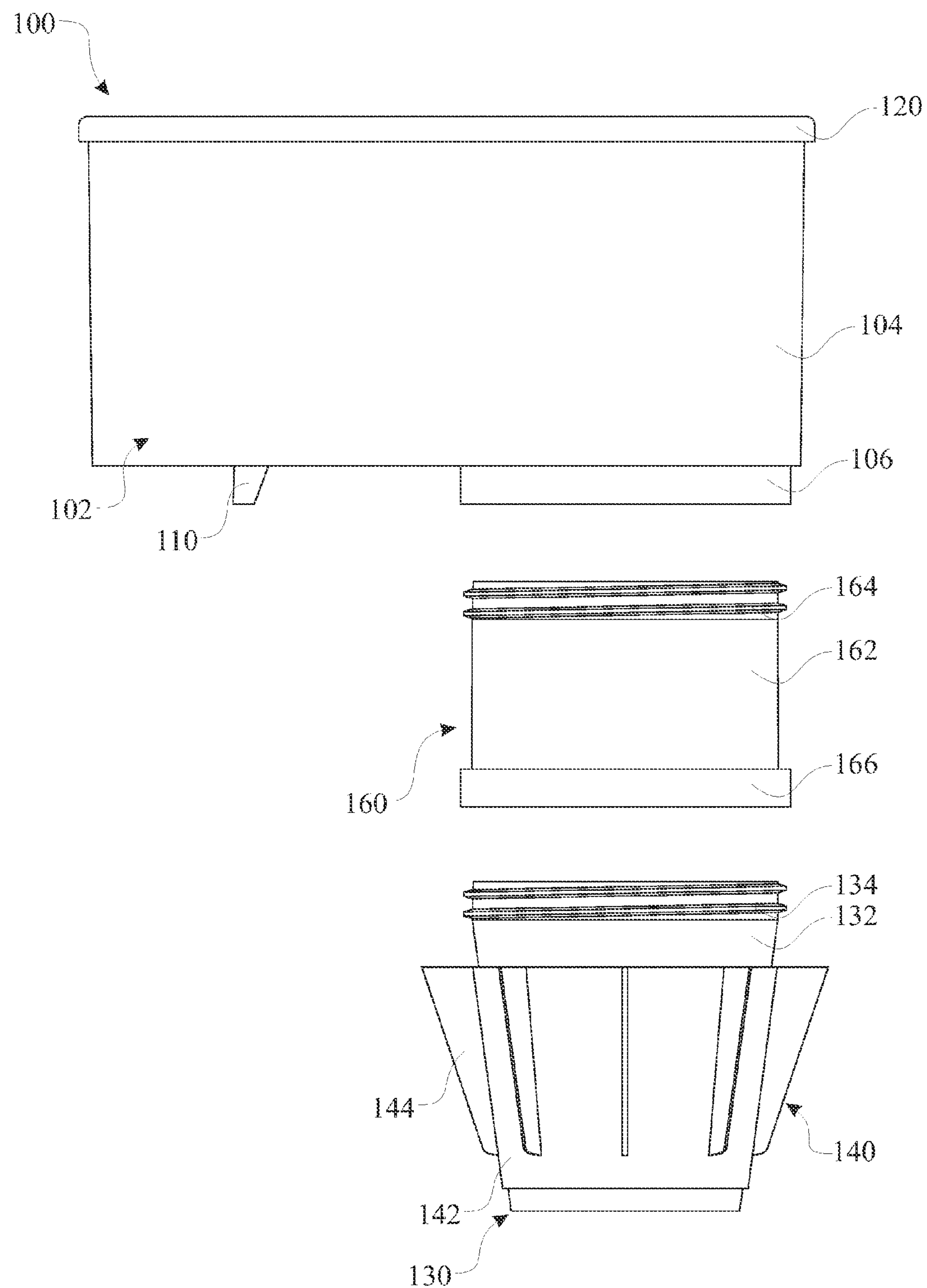
FIG. 15 is a side elevation assembly view of the cup holder insert member, a cup holder insert extension member, and the bowl member.

For instances where the bowl 102 needs to be raised from the cup holder insert 130, a mount extension 160 can be assembled between the cup holder insert 130 and the bowl 102, as illustrated in FIG. 15. The mount extension 160 is fabricated having an extension body 162, with an extension male threading 164 formed along an upper edge and an extension female threading 166 formed along a lower edge. The extension male threading 164 would be removably attached to the mount receptacle 106 and the extension female threading 166 being removably attached to the mount securing threads 134. The extension body 162 could be hollow, increasing the available storage volume of the object storage receptacle 136. The spacing can vary via having mount extension 160 with different lengths, utilizing a plurality of mount extension 160 or combination thereon.

Figure 16:
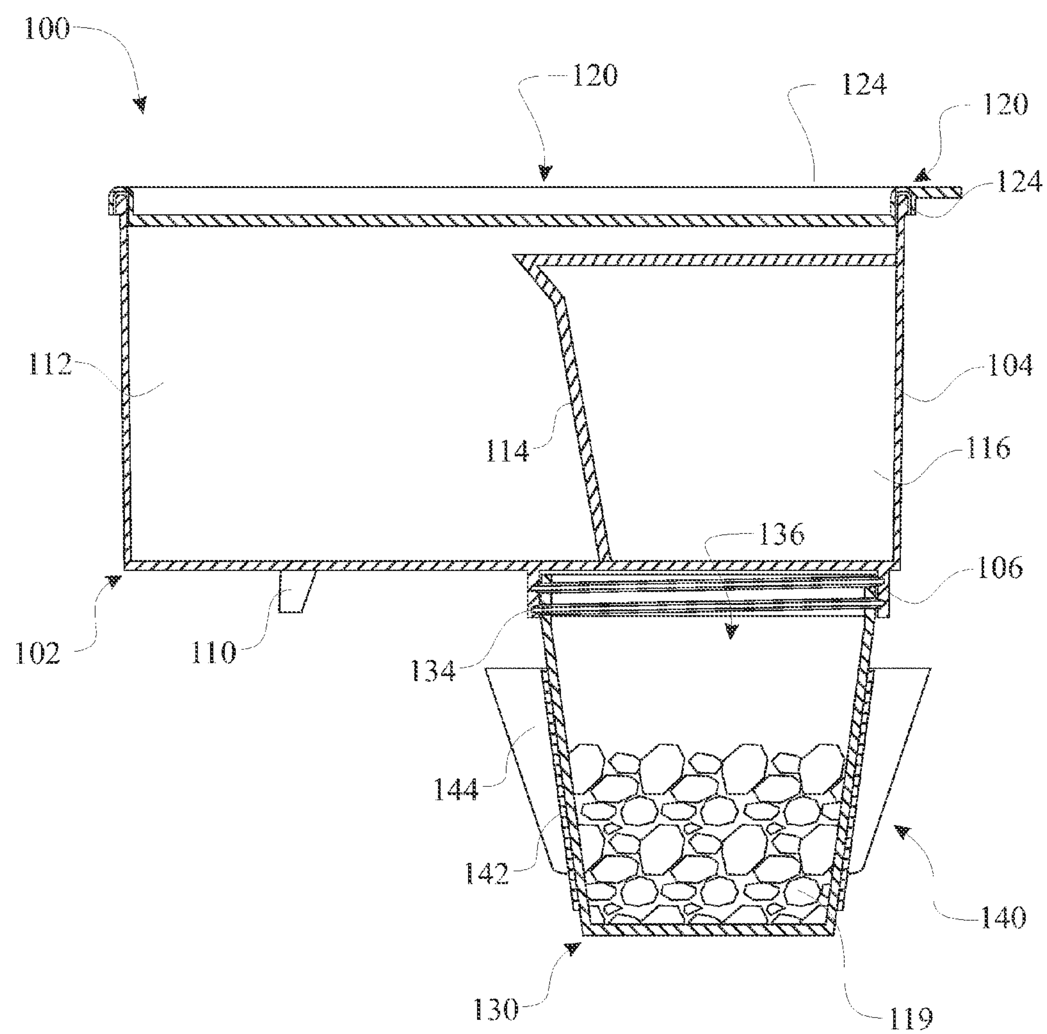
FIG. 16 is a sectional elevation view of the travel bowl assembly.

Snacks 119 can be stored in the object storage receptacle 136 as illustrated in the sectional view of FIG. 16. Alternately, snacks 119 can be stored in the snack containing section 112, being sealed via the cover 120.

Figure 17:
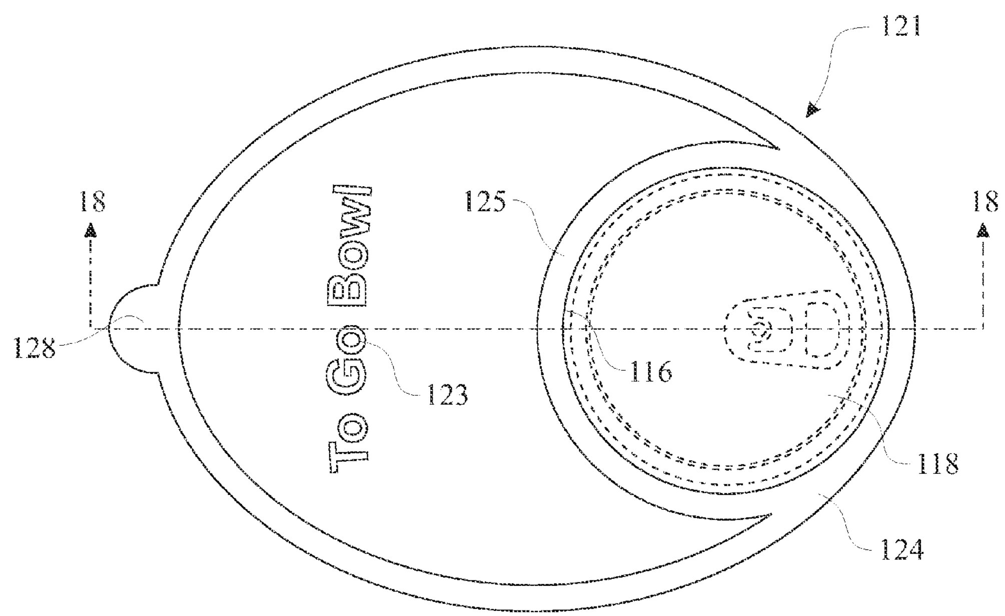
FIG. 17 is a top planar view of the exemplary lid installed on the travel bowl assembly, further illustrating the interaction of the exemplary lid and a drink.
Figure 18:
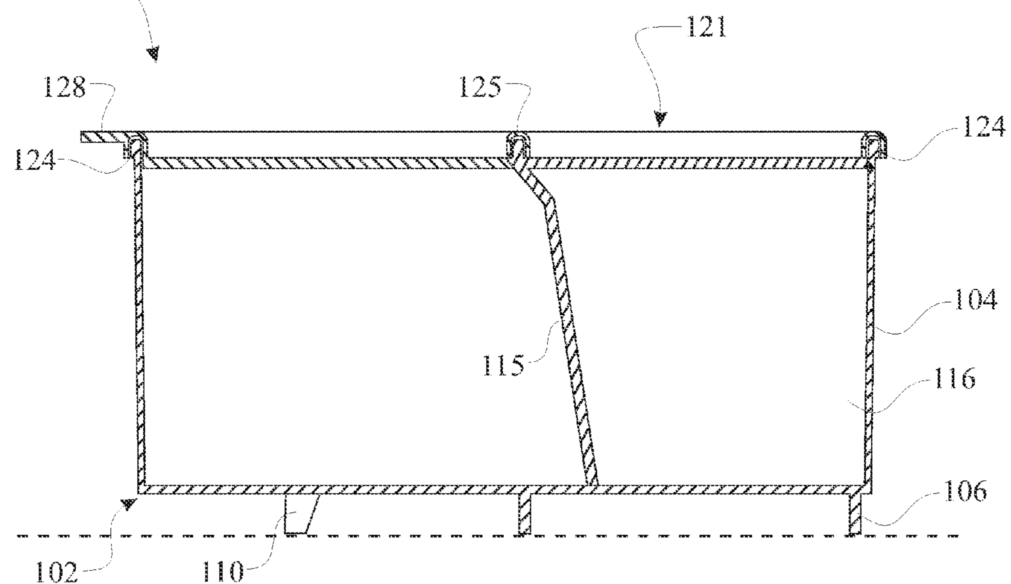
FIG. 18 is a side sectional view of the travel bowl assembly, the section taken along section 18-18 of FIG. 17.

Two (2) alternate bowl configurations are presented in FIGS. 17 through 20. The extended bowl sectioning wall 115 can be extended, providing an additional coupling region for securing a cover 121 to the bowl body 104 as illustrated in FIGS. 17 and 18. The cover 121 would include an opening, which provides a clearance for insertion and removal of a drink 118. By providing a cover securing interface 125, the user can secure the cover 121 to the bowl 102 and rotate the cover 121 about the drink 118, thus giving access to snacks stored in the snack containing section 112. A small notch can be provided along the snap latch ring 126 (FIG. 2) for clearance for the rotation.

Figure 19:
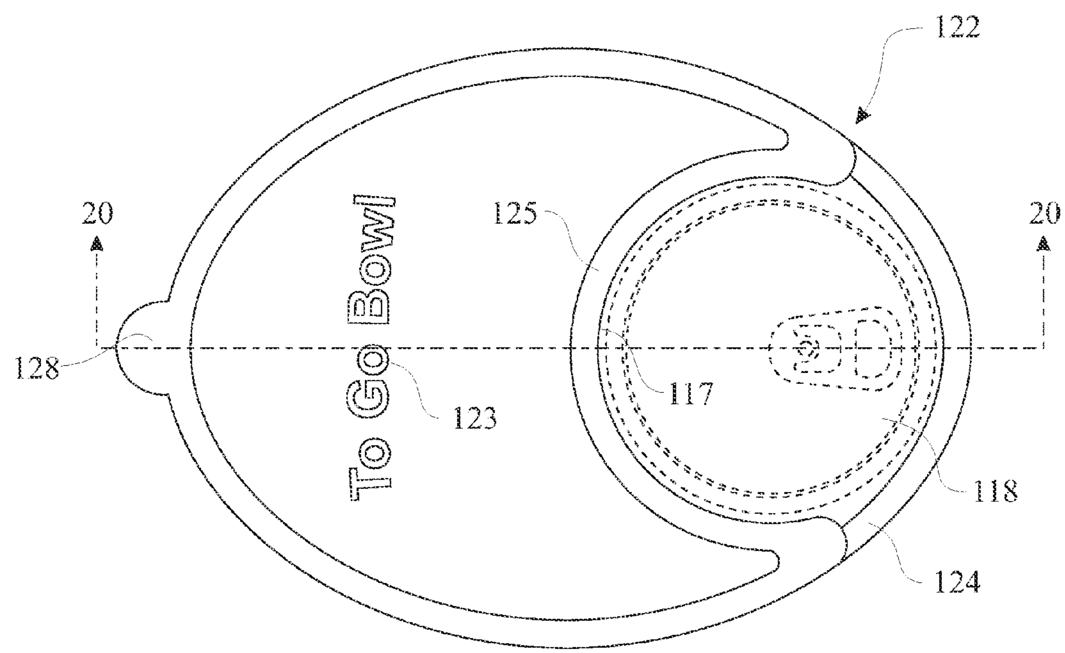
FIG. 19 is a top planar view of an alternate exemplary lid installed on an alternate embodiment of the travel bowl member, further illustrating the interaction of the alternate exemplary lid and a drink.
Figure 20:
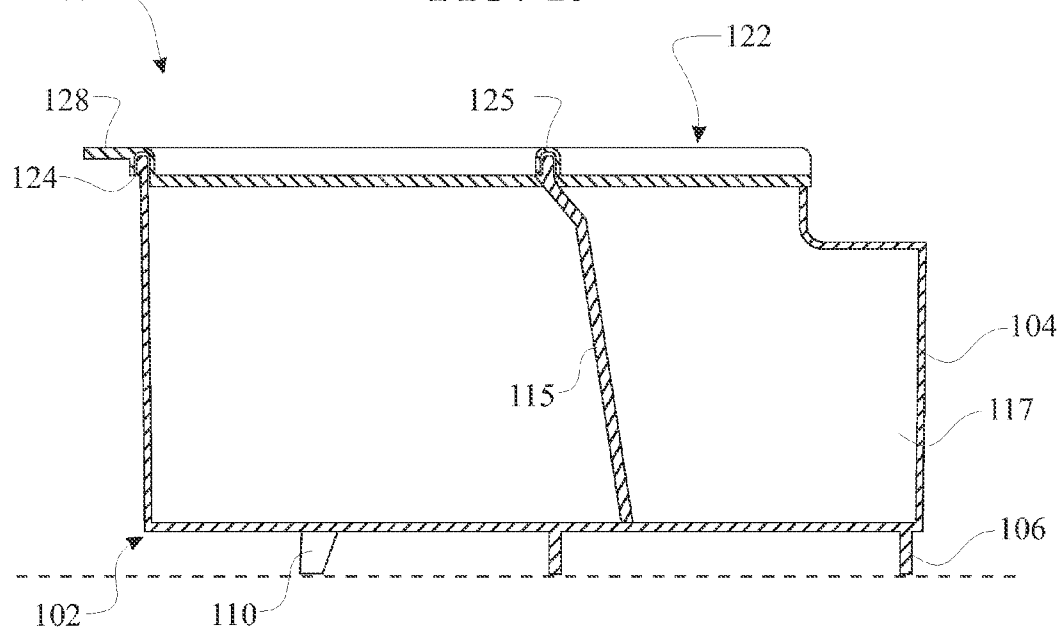
FIG. 20 is a side sectional view of the alternate travel bowl assembly embodiment, the section taken along section 20-20 of FIG. 19.
Figure 21:
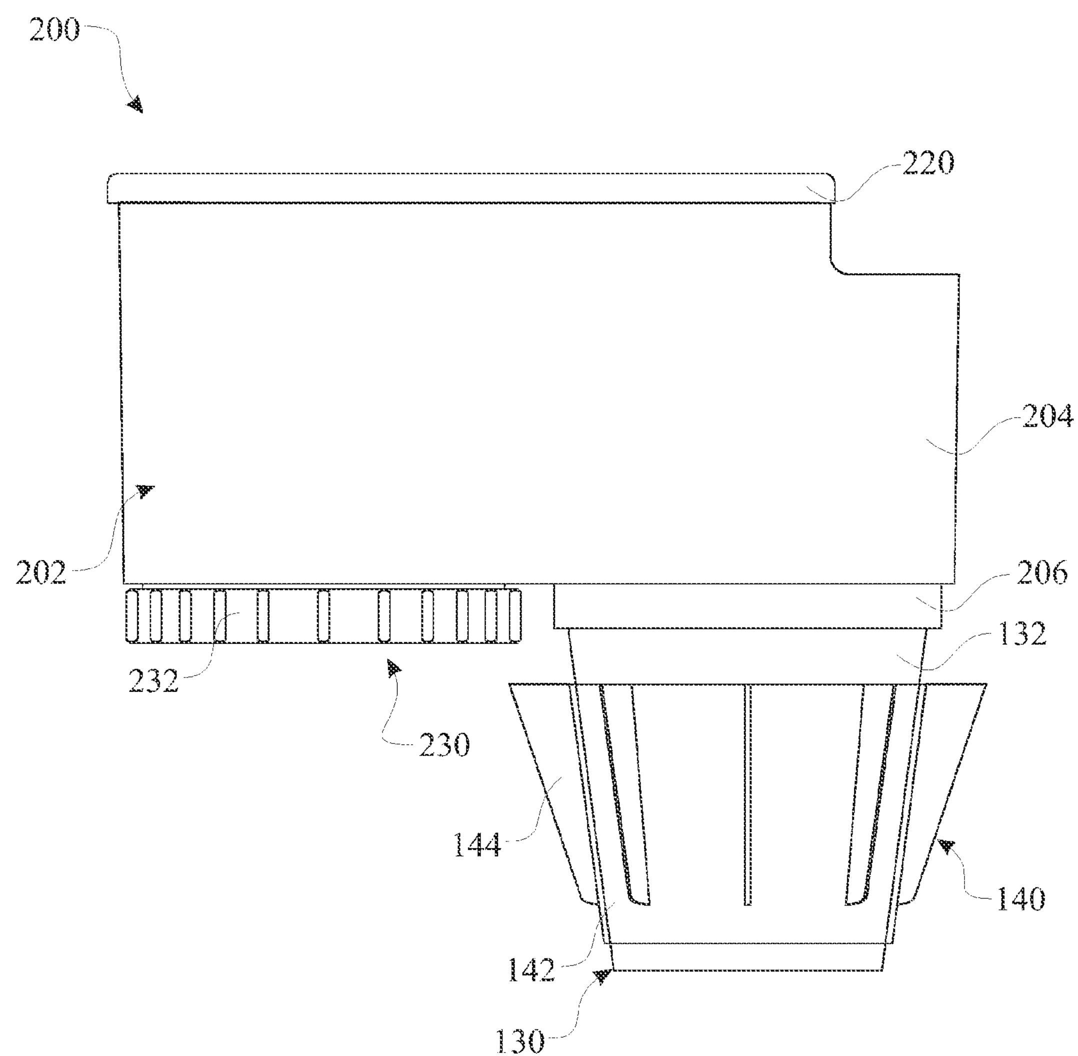
FIG. 21 is a side elevation view of yet another alternate travel bowl assembly embodiment.
Figure 22:
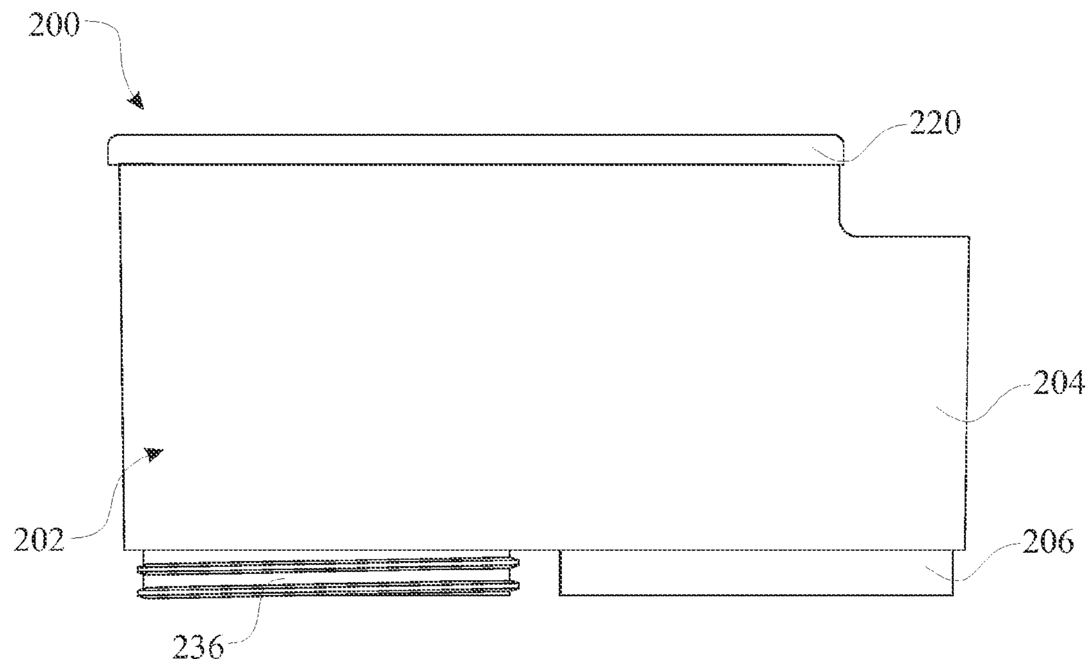
FIG. 22 is a side elevation view of a bowl body portion of the travel bowl assembly embodiment, originally presented in FIG. 21.
Figure 23:
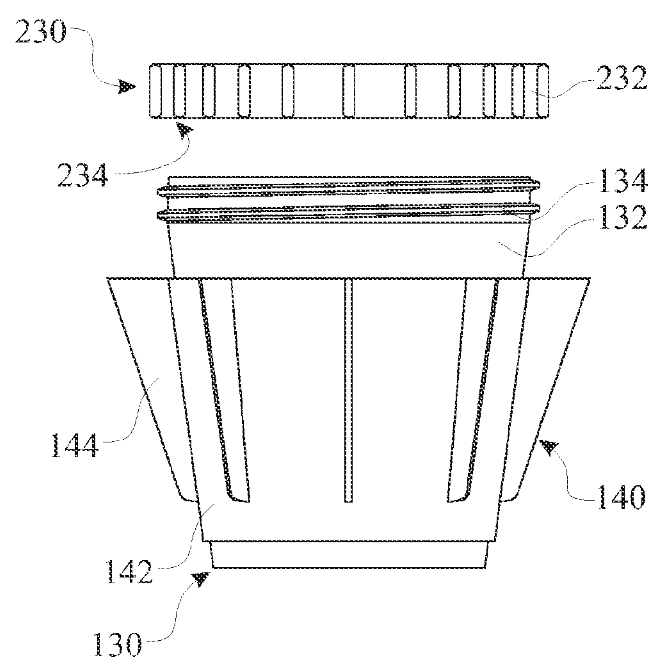
FIG. 23 is a side elevation view of a lid and container portion of the travel bowl assembly embodiment, originally presented in FIG. 21.

Alternately, the extended bowl sectioning wall 115 can be extended as previously shown and a portion of the bowl body 104 adjacent to the easy access drink holder section 117 can be formed shorter as illustrated in FIGS. 19 and 20. The cover 122 would be formed having a crescent shape, exposing the easy access drink holder section 117. The lower wall section of the bowl body 104 improves access to the drink 118.

The present invention utilizes a cup holder insert 130 as the mounting interface for removably securing the travel bowl assembly 100 to a vehicle cup holder. The present invention can be adapted to other applications such as a stroller, crib, child's car seat, bicycle, and the like by providing a variation of the cup holder insert 130. The mount would have a similar interface for securing the mount to the bowl 102, while having a form factor suitable for securing the travel bowl assembly 100 to a respective object, such as a loop for securing the mount to a handlebar. The loop can have any specific features allowing the loop to tighten and release from the tubular structure. Other designs, such as a quick release camera mount design, and the like can be utilized.

The mount container body 132 can be sealed via several means, as illustrated in FIGS. 21 through 24. A travel bowl assembly 200 comprises a bowl 202, similar to the bowl 102 previously introduced. The bowl 202 includes a bowl body 204, formed having a bowl base and a vertical wall projecting upwards from a perimeter of said base. A container mount receptacle 206 is disposed upon a lower surface of the bowl base for removably attaching the mount container body 132. This configuration provides a first means for sealing the container portion of the mount container body 132. A container lid assembly 230 provides an alternate means for sealing the mount container body 132, versa vi the utilization of the bottom of the bowl body 204. The container lid assembly 230 is formed including a container lid 232 and a lid coupling interface 234 formed along a coupling edge of the container lid assembly 230. The container lid assembly 230 is stored when not in use by removably coupling the container lid assembly 230 to a lid storage coupling interface 236 disposed upon the lower surface of the bowl base. The removable coupling is accomplished via a mechanically coupling provided between the lid coupling interface 234 and the lid storage coupling interface 236. The lid coupling interface 234 can be of any form factor providing a mechanical interface for mating to the mount securing threads 134 provided along a coupling edge of the mount container body 132. When the container lid assembly 230 and mount container body 132 are removed from the bowl body 204, the travel bowl assembly 200 remains level on the resting surface 150, using the bottom of the container mount receptacle 206 and the lid coupling interface 234 as a supporting structure.

Figure 24:
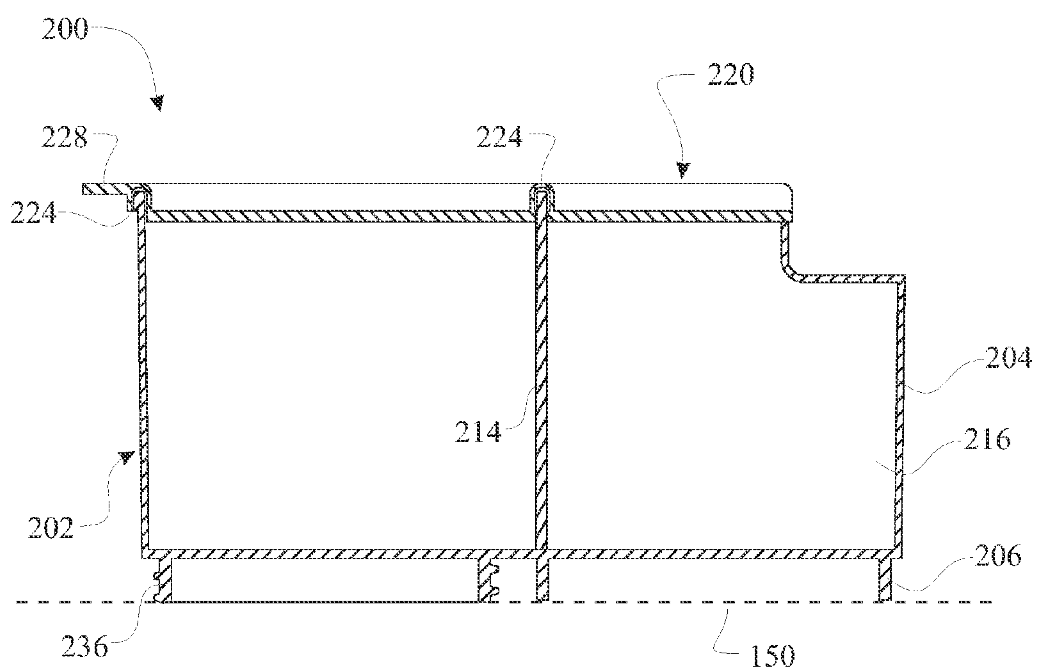
FIG. 24 is a side sectional view of the alternate travel bowl assembly embodiment, the section taken along a section similar to section 20-20 of FIG. 19.

The bowl sectioning wall 114 can be of any shape such as being angled, as illustrated in FIGS. 5, 16, 18, and 20. Alternately the bowl sectioning wall 214 is presented as having a vertical configuration, as illustrated in FIG. 24. The sectioning wall 214 aids in securing a drink 118 (FIG. 19) within the drink holder section 116 (FIG. 20). The sectioning wall 214 can be either straight as shown herein, or angled as previously presented. The sectioning wall having a vertical configuration increases manufacturability. A production design would be determined by the product designer.

Figure 25:
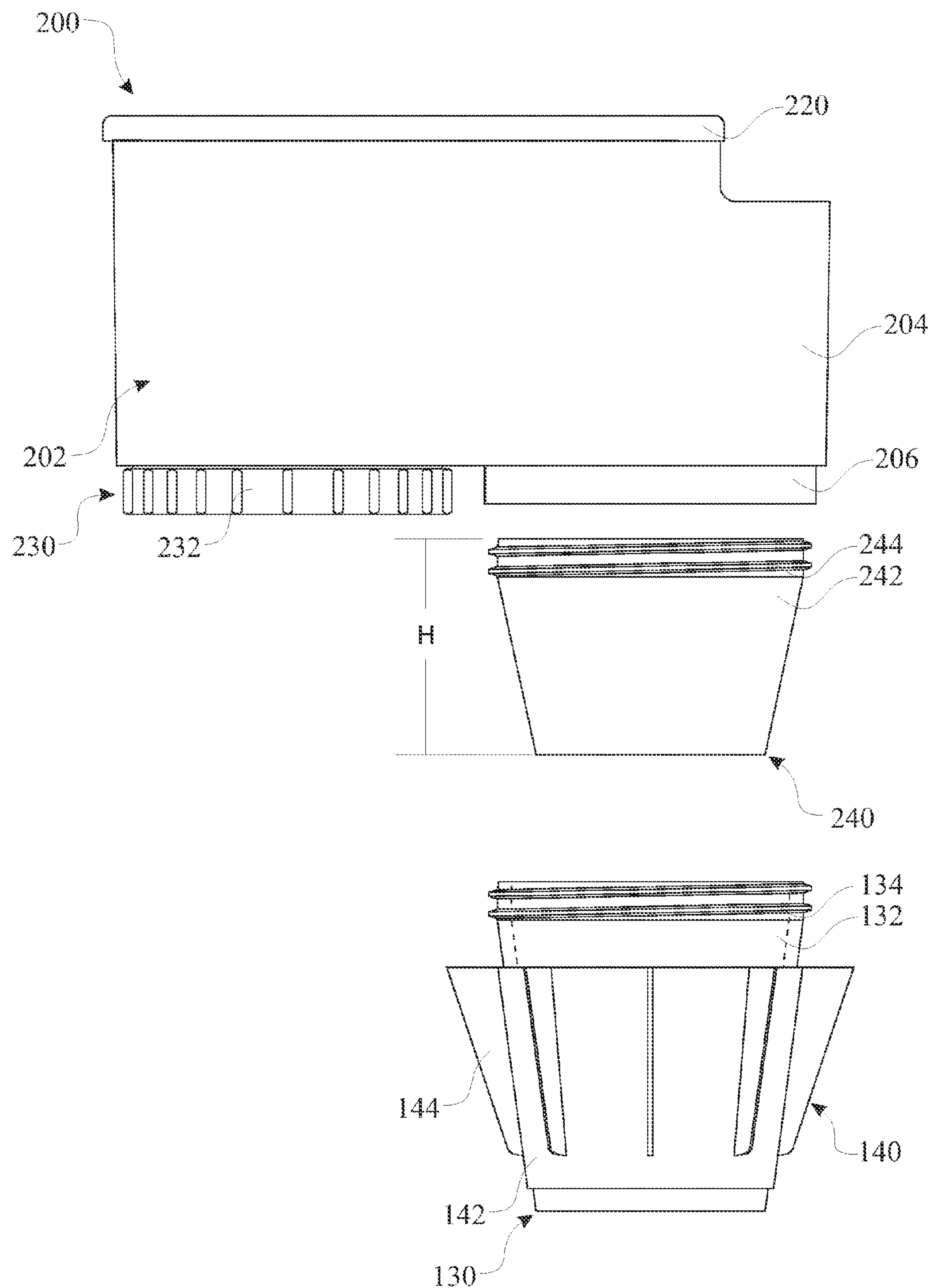
FIG. 25 is a side elevation view illustrating a nesting of a plurality of containers for varying a height of the bowl assembly.

A plurality of containers 130, 240 can be included with the travel bowl assembly 200 as illustrated in FIG. 25. Container 240 comprises the same features as container 130, including a mount container body 242 and a mount securing threads 244, while having different heights (H). The containers 130, 240 are shaped providing the ability for the user to nest the plurality of containers 130, 240 as illustrated. The various heights (H) provides several advantages, including compatibility in different vehicle cup holders, different storage volumes, and the like. Nesting the plurality of containers increases the potential number of heights.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A travel bowl assembly comprising:

a bowl having a bowl base and a vertical wall projecting upwards from a perimeter of said base;

a sectional wall dividing an interior portion of said bowl into a snack section and a cup holder;

a bottom surface of said bowl base comprising a mating engaging interface and a leveling feature each projecting downwardly from said bottom surface, wherein said mating engaging interface and said leveling feature equally project downwardly to enable a level support for said bowl when placed onto a surface; a container having a base and a vertical wall projecting upwards from a perimeter of said base providing a storage volume, said container having a size and shape of a recess of a cup holder in a console of a vehicle;

a container mechanical fastener disposed about an interface edge of said container;

said bottom surface further comprising a mating container mechanical fastener for removably securing said container to a bottom of said bowl; and said leveling feature further comprising a removable pedestal capable of being mated with said container mechanical fastener to form a removable cover to independently seal said container.

2. A travel bowl assembly as recited in claim 1, the bowl assembly further comprising a cover that is removably attached to the bowl and seals said snack portion of said bowl.

3. A travel bowl assembly as recited in claim 1, the bowl assembly further comprising a cover that is removably attached to and seals the bowl.

4. A travel bowl assembly as recited in claim 1, the bowl assembly further comprising a pliant member disposed upon an exterior of said container sidewall for adapting to cup holders of various dimensions.

5. A travel bowl assembly as recited in claim 4, wherein the pliant member is removably attached to the container sidewall.

6. A travel bowl assembly as recited in claim 5, wherein the pliant member comprises a plurality of winglets.

7. A travel bowl assembly as recited in claim 4, wherein the pliant member comprises a plurality of winglets.

8. A travel bowl assembly comprising:

a bowl having a bowl base and a vertical wall projecting upwards from a perimeter of said base;

a sectional wall dividing an interior portion of said bowl into a snack section and a cup holder;

a container having a base and a vertical wall projecting upwards from a perimeter of said base providing a storage volume, said container having a size and shape of a recess of a cup holder in a console of a vehicle;

a container mechanical fastener disposed about an interface edge of said container;

a bottom surface of said bowl base comprising a mating container mechanical fastener for removably securing said container to a bottom of said bowl;

a container cover comprising a mating container mechanical fastener;

said bottom surface further comprising a mating container cover mechanical fastener for removably securing said container cover to a bottom of said bowl; and wherein said container cover provides a leveling feature to enable a level support for said bowl when placed onto a surface.

9. A travel bowl assembly as recited in claim 8, the bowl assembly further comprising a cover that is removably attached to the bowl and seals said snack portion of said bowl.

10. A travel bowl assembly as recited in claim 8, wherein a lower edge of the mating container mechanical fastener and a lower edge of the mating container cover mechanical fastener provide a support surface for said bowl assembly.

11. A travel bowl assembly as recited in claim 8, the bowl assembly further comprising a pliant member disposed upon an exterior of said container sidewall for adapting to cup holders of various dimensions.

12. A travel bowl assembly as recited in claim 11, wherein the pliant member is removably attached to the container sidewall.

13. A travel bowl assembly as recited in claim 8, wherein at least a portion of the top edge of the bowl about the cup holder portion is closer to the base when compared to the edge of the bowl about the snack portion of said bowl.

14. A travel bowl assembly comprising:

a bowl having a bowl base and a vertical wall projecting upwards from a perimeter of said base;

a sectional wall dividing an interior portion of said bowl into a snack section and a cup holder;

a container having a base and a vertical wall projecting upwards from a perimeter of said base, said container having a size and shape of a recess of a cup holder in a console of a vehicle;

a container mechanical fastener disposed about an interface edge of said container;

a bottom surface of said bowl base comprising a mating container mechanical fastener for removably securing said container to a bottom of said bowl;

said container mechanical fastener securable to said mating container mechanical fastener via a releasable connection interface design comprising at least one of:

a) a twisting motion of the container respective to the bowl, b) a snap release interface, c) a magnetic interface;

said bottom surface further comprising a mating container cover mechanical fastener for removably securing a container cover to a bottom of said bowl; and wherein said container cover provides a leveling feature to enable a level support for said bowl when placed onto a surface.

15. A travel bowl assembly as recited in claim 14, wherein a lower edge of the mating container mechanical fastener and a lower edge of the mating container cover mechanical fastener provide a base support surface for said bowl assembly.

16. A travel bowl assembly as recited in claim 14, the bowl assembly further comprising a cover that is removably attached to the bowl and seals said snack portion of said bowl.

17. A travel bowl assembly as recited in claim 14, the bowl assembly further comprising a pliant member disposed upon an exterior of said container sidewall for adapting to cup holders of various dimensions.

18. A travel bowl assembly as recited in claim 17, wherein the pliant member is removably attached to the container sidewall.

19. A travel bowl assembly as recited in claim 18, wherein the pliant member comprises a plurality of winglets.

20. A travel bowl assembly as recited in claim 14, wherein at least a portion of the top edge of the bowl about the cup holder portion is closer to the base when compared to the edge of the bowl about the snack portion of said bowl.

* * * * *